US009767797B2

(12) United States Patent
Mickelsen et al.

(10) Patent No.: US 9,767,797 B2
(45) Date of Patent: Sep. 19, 2017

(54) VOICE INPUT HANDLING

(71) Applicant: EchoStar Technologies L.L.C., Englewood, CO (US)

(72) Inventors: Jeremy Mickelsen, Denver, CO (US); David A. Innes, Littleton, CO (US); Brad Bylund, Littleton, CO (US); Rashmi Hegde, Littleton, CO (US); Christopher Burns, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 120 days.

(21) Appl. No.: 14/532,033

(22) Filed: Nov. 4, 2014

(65) Prior Publication Data
US 2016/0127816 A1    May 5, 2016

(51) Int. Cl.
*H04R 29/00* (2006.01)
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01); *H04R 2227/003* (2013.01); *H04R 2410/00* (2013.01)

(58) Field of Classification Search
CPC ................................... H04R 3/00; H04R 1/08
USPC ........................................................... 381/56
See application file for complete search history.

(56) References Cited

U.S. PATENT DOCUMENTS

| 9,304,736 B1 | 4/2016 | Whiteley et al. |
| 9,357,321 B1 * | 5/2016 | Polansky ................ G10L 15/26 |
| 2004/0225502 A1 * | 11/2004 | Bear ........................ G10L 15/26 704/270 |

OTHER PUBLICATIONS

Nexus Player: Everything you need to know about Google's Android TV Box; http://www.techradar.com/us/news/television/nexus-player-release-date-news-and-features-1269424; Oct. 21, 2014; 8 pages.
Google Nexus Player review; http://www.theverge.com/2014/11/3/7149505/google-nexus-player-review; Nov. 3, 2014; 8 pages.
Review: Google Nexus Player; http://www.wired.com/2014/11/google-nexus-player; Nov. 3, 2014; 7 pages.

* cited by examiner

*Primary Examiner* — Paul S Kim
(74) *Attorney, Agent, or Firm* — Bejin Bieneman PLC

(57) ABSTRACT

In an input device it is determined that an input indicator mechanism is selected for a predetermined period of time. Speech is recorded based on the input indicator mechanism being selected.

18 Claims, 2 Drawing Sheets

VOICE INPUT HANDLING

BACKGROUND

Electronic computing devices may accept voice input, e.g., voice commands. The meaning of such input is determined according to speech recognition techniques. However, mechanisms for determining when a speech recognition session begins and ends are lacking. For example, a device may include a physical or virtual button, switch, or the like to be selected by a user to indicate that a speech recognition session is initiated. However, some input mechanisms, sometimes referred to as "press and release," or "P & R," may be used to indicate a beginning of a speech recognition session, but are not required to be selected for the duration of the speech recognition session. For example, a button may be depressed and released to indicate the beginning of a speech recognition session. In other cases, an input mechanism, sometimes referred to as "push to talk," or "PTT," may be used to indicate a speech recognition session according to a time during which an input mechanism is selected, e.g., a button is depressed. Some users may prefer or assume that input mechanism will operate according to the P & R model, while other users may prefer or assume that input mechanism will operate according to the PTT model. However, present devices are lacking in their ability to detect whether a user is providing speech input using P & R or PTT input.

DRAWINGS

Figure 1:
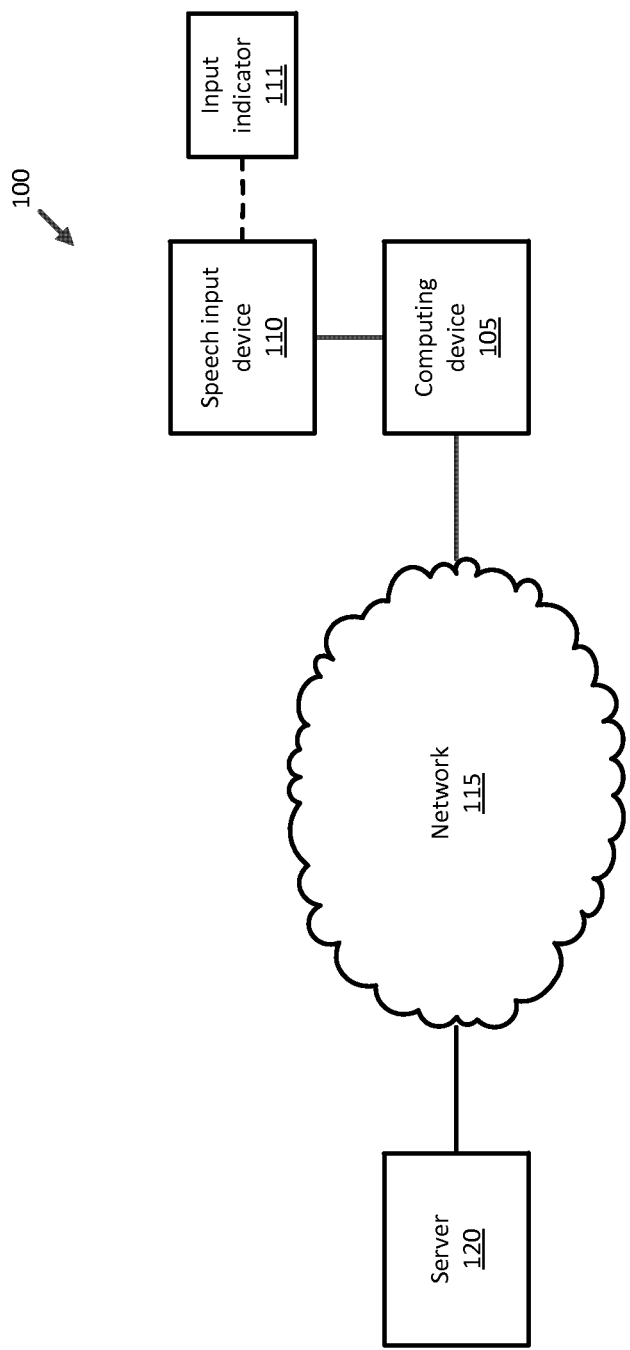

FIG. 1 a block diagram of an exemplary media system including a speech input device.

Figure 2:
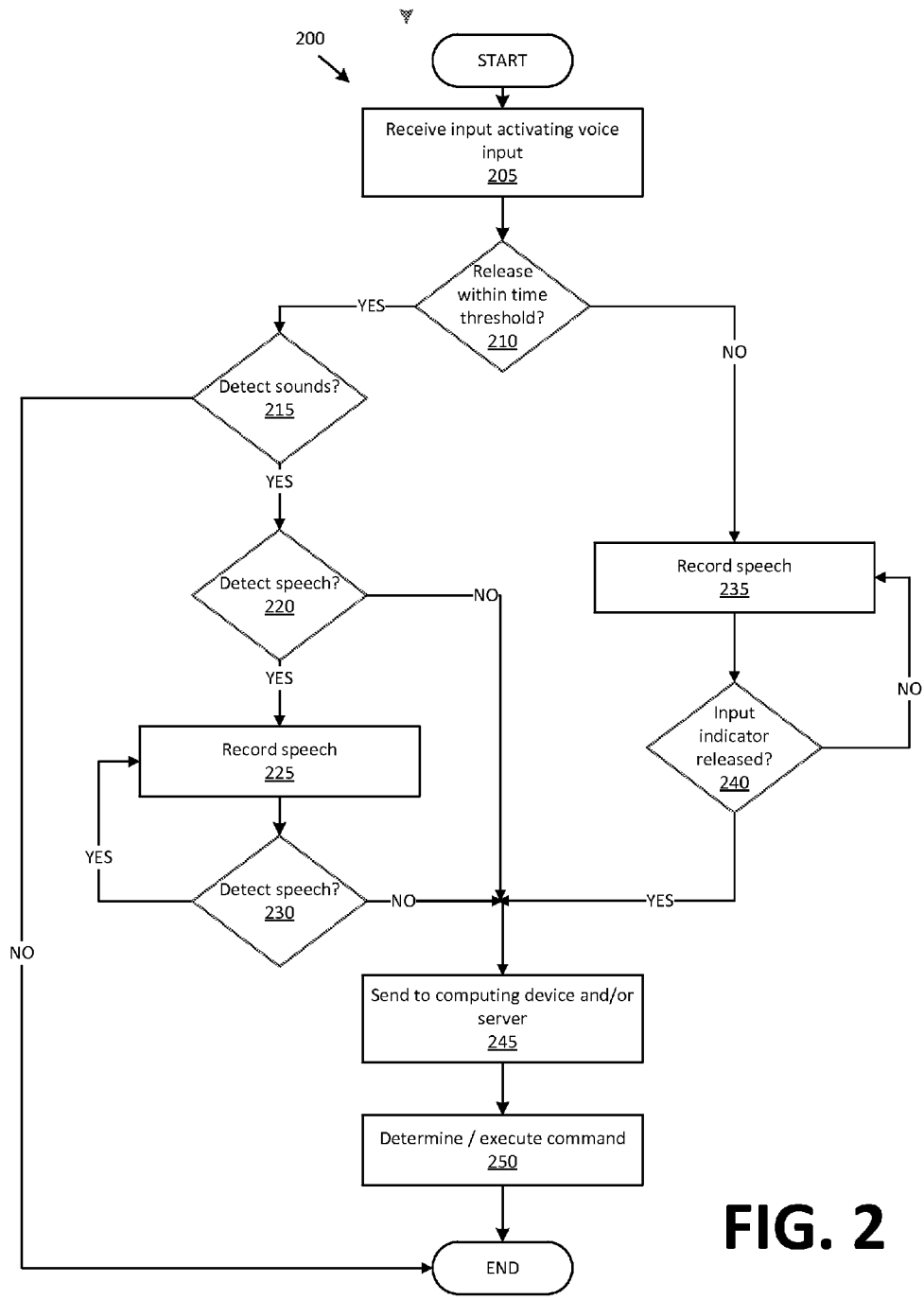

FIG. 2 is a diagram of an exemplary process for identifying a speech input mode.

DETAILED DESCRIPTION

Overview

FIG. 1 a block diagram of an exemplary media system 100 including a speech input device 110 for providing input to a computing device 105. The speech input device 110 may itself be a computing device, e.g., include a processor and a memory, and is generally capable of accepting voice or speech input, and further is generally capable of at least two speech input modes. As used herein, the term "speech input mode" refers to a disposition of an input mechanism, e.g., a button, a switch, or the like, to indicate that a speech input session, e.g., a speech recognition session, is occurring. Examples of speech input modes are the P & R and PTT modes discussed in the background section. The speech input device 110 provides speech input to the computing device 105, which may in turn provide speech input via a network 115 to a server 120 for speech recognition, identification of commands or inputs in the speech input, etc. The speech input device generally includes an input mechanism as well as programming to detect a state of the input mechanism, e.g., depressed/non-depressed, on/off, etc. By detecting the state of the input mechanism along with speech input being received, the speech input device 110 can determine a speech input mode selected by a user. Thus, the speech input device 110 can advantageously determine when input should be provided to the computing device 105 and/or the server 120 for speech recognition.

Example System Elements

The computing device 105 may be a specialized device for receiving media content, e.g., a set-top-box (STB) or the like, and is generally a device including a computer processor and associated storage, e.g., volatile memory, nonvolatile memory, etc., and capable of communicating via the network 115, as well as directly with other devices using wired or wireless protocols (e.g., IEEE 802.11, Bluetooth, ZigBee, RF4CE, etc.). Exemplary devices 105 include, in addition to a set-top-box, a personal computer such as a laptop, handheld, or tablet computer, a smart phone, etc. Further, as mentioned above, the device 105 may be connected to or include a display device, e.g., a television, a display of a personal computer, etc.

The speech input device 110 generally includes a microphone or the like for receiving speech input, as well as a speech input indicator mechanism 111, i.e., an input mechanism for a user to input that speech input is or is about to be provided. Accordingly, the input device 110 may be a conventional remote control or the like equipped to receive speech input, e.g., in cases in which the computing device 105 is an STB a remote control for the STB could include a microphone as well as a and input indicator mechanism 111 in the form of a virtual or physical button or switch. Alternatively or additionally, the input device 110 could be a mechanism such as a keyboard, touchscreen, pointing device, etc. Yet further alternatively or additionally, the input device 110 may be included in or attached to the computing device 105, e.g., the input device 110 could include a microphone and/or buttons, switches, etc., That serve as the input indicator mechanism 111.

A computing device 105 such as an STB may utilize various mechanisms for receiving media content, e.g., media content data may be provided as video-on-demand or programming through a cable, satellite or internet protocol television (IPTV) distribution system, as streaming Internet video data (e.g., from a site such as Netflix, YouTube, Hulu, etc.), or as some other kind of data. Media content is generally delivered via the network 115 in a digital format, e.g., as compressed audio and/or video data. For example, MPEG refers to a set of standards generally promulgated by the International Standards Organization/International Electrical Commission Moving Picture Experts Group (MPEG). H.264 refers to a standard promulgated by the International Telecommunications Union (ITU).

The network 115 represents one or more mechanisms for communications between the computing device 105 and the server 120 and/or for delivering media content from a content source 105 to a media device 120. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

The server 120 may be one or more computer servers, generally including at least one processor and at least one memory, the memory storing instructions executable by the processor, including instructions for carrying out various of the steps and processes described herein. For example, the server 120 generally includes instructions for receiving a speech file from the computer 105 and performing speech recognition with respect to the speech file.

Exemplary Process Flows

FIG. 2 is a diagram of an exemplary process 200 for identifying a speech input mode. The process 200 begins in a block 205, in which an input device 110 receives input according to the input indicator 111 activating a speech input mode. For example, the input indicator 111 could be a physical or virtual button on the input device 110 that is depressed, a switch that is moved to a "talk" position, etc. Further, in some implementations, the device 110 begins recording received sounds, possibly including speech, as soon as the input indicator 111 is activated. Such received sounds may be stored in a memory of the device 110 and saved at least until it is determined, as described below, whether user speech should be captured. The reason for beginning recording immediately upon activation of the input indicator 111 is that many users will expect the device 110 to begin recording as soon as the input indicator 111 is selected, e.g., a button is depressed. Further, some speech recognition systems require as much advance sound as possible.

Next, in a block 210, the input device 110 determines whether the input indicator 111, having been depressed, selected, etc., has been released within a predetermined time threshold. For example, if the input indicator 111 is selected but then released within a time threshold such as a tenth of a second, a quarter of a second, one second, etc., then the input device 110 may be programmed to proceed based on the understanding that a user has selected a push and release (P & R) speech input mode, and the process 200 proceeds to a block 235. However, if an input indicator 111 is selected and remains selected, e.g., depressed, past the predetermined time threshold, then the input device 110 may be programmed to proceed on the understanding that a user has selected a push-to-talk (PPT) speech input mode, in the process 200 proceeds to a block 215.

In the block 215, which may follow the block 210, the input device 110 determines whether sounds are being inputted into a microphone of the input device 110. For example, if sounds exceeding a certain level of decibels are detected, the process 200 may proceed to the block 220. Otherwise, the process 200 may end. Note that, in many implementations, the block 215 is not executed until a predetermined period of time, e.g., 1 second, 2 seconds, etc., to give a user time to begin providing speech. Further, this duration could be determined according to a period of time that allows the device 110 to communicate with the computing device 105, e.g., the device 110 could communicate to the device 105 that the input indicator 111 was selected, whereupon the device 105 could communicate to the input device 110 to check for sound levels associated with speech being provided and/or to begin recording, whereupon the device 110 could begin recording, check received amplitudes of sound to perform the check associated with this block 215.

In the block 220, which may follow the block 215, the input device 110 determines whether speech is detected. For example, even if sounds are detected above a certain decibel level, such sounds could be caused by music, machinery, or other sources that are not speech directed to the input device 110. Accordingly, the input device 110 could determine frequencies detected in a sound envelope received in a microphone of the input device 110. If such frequencies were associated with human speech, then the process 200 could proceed to a block 225. Otherwise, the process 200 could end. Note that, in the block 220, several criteria or combinations of criteria may be examined depending on available processing resources. Many mechanical sources of noise are at least roughly periodic and fixed in frequency content over periods of time on the order of seconds. By observing the changes, smoothness of changes (or lack thereof) in the frequency domain, mechanical noise may be generally distinguished from voice. Additionally some codecs such as SPEEX have faculties which may aid in determining when voice has ended.

In the block 225, the input device 110 records received speech, e.g., in a memory of the input device 110. Alternatively or additionally, the input device 110 could provide received speech on a substantially real-time basis, e.g., streaming, to the computing device 105, which could then store the received speech in its memory. This may be done to reduce system latency and/or to overcome memory limitations of the device 110.

Following, or substantially contemporaneously with, the block 225, the input device 110 determines whether inputted speech has ended, i.e., whether speech input is detected as described above with respect to the block 220. If speech input continues, then the process 200 returns to the block 225. Otherwise, the process 200 proceeds to the block 245.

In the block 235, which may follow the block 210 as described above, the input device 110 records speech, e.g., as described above with respect to the block 225, an input indicating mechanism 111 having been activated, e.g., a button on the device 110 having been depressed. Accordingly, in the block 235, the input device 110 records received sounds via a microphone of the device 110. Further, the input device 110 may perform filtering such as discussed above to record only frequencies associated with a human voice.

Following, or substantially contemporaneously with, the block 240, the input device 110 determines whether the input indicator mechanism 111 has been released. If not, the process 200 continues with the block 235. If the mechanism 111 has been released, then the process 200 proceeds to the block 245.

In the block 245, speech recorded in one of the blocks 225, 235 is provided to a device equipped to perform speech recognition. For example, the input device 110 could provide recorded speech to the computing device 105, which could then perform speech recognition to determine an inputted command from the recorded speech. However, in many instances, the computing device 105 may not be equipped to perform speech recognition and/or may not have sufficient processing power to perform speech recognition with a sufficiently rapid response time, e.g., where the computing device 105 is an STB. Accordingly, the computing device 105 may provide the recorded speech via the network 115 to the server 120.

In the block 245 (and/or in one of the blocks 225, 235 above) the device 110 may perform filtering and/or signal processing of received sounds. For example, as mentioned above, filtering could be performed as described above with respect to frequencies associated with a human voice. Additionally or alternatively, filtering and/or signal processing, e.g., performed by a processor of the device 110 and/or according to software instructions executed by the processor of the device 110, could perform other filtering and processing, e.g., decimation (in time), conversion between formats (e.g., PDM to I2S/PCM, or Analog to PCM, etc.), or implementation of a low pass filter such as is known.

Further, although shown in FIG. 2 as occurring after one of the blocks 230, 240 for ease of illustration, note that the block 245 could be performed between either the blocks 225 and 230 or between the blocks 235 and 240. That is, the device 110 could send recorded speech to the computer 105 on a periodic or even substantially continuous, e.g., streaming, basis, as the speech is being recorded.

In a block 250, following the block 245, the server 120 may perform speech recognition and provide a command or commands determined from the recorded speech to the computing device 105. Alternatively, as mentioned above, the computing device 105 may have foregone sending the recorded speech to a server 120, and may determine a command or commands after performing speech recognition. Speech recognition, whether performed by the device 105 or the remote server 120, may be performed in a known manner, where a sound file is provided as input, and a text string comprising one or more words is provided as output. Further, the server 120 and/or the device 105 may use a lookup table or the like to associate words parsed from the text string with commands to be executed by the device 105. The device 105 may then execute the command or commands determined from the recorded speech. For example, an STB device 105 may raise or lower a volume at which audio in media content is being played back, may change a television channel being viewed, may pause or stop playback of media content, etc.

Note that, where the block 245 is performed between either the blocks 225 and 230 or between the blocks 235 and 240, the block 250 may likewise be performed between either the blocks 225 and 230 or between the blocks 235 and 240, and after the block 245. That is, recorded speech may be sent to the computer 105 as further speech is being recorded, and may be subjected to speech recognition by the computer 105 and/or the server 120 as further speech is being recorded.

Following the block 250, the process 200 ends.

Conclusion

As used herein, "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Assembly language, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An input device configured to distinguish between providing speech input in a press-to-talk speech input mode versus a press-and-release speech input mode, the device comprising:
   a processor; and
   a memory storing instructions executable by the processor such that the input device is programmed to:
   detect an amount of time for which an input indicator mechanism is selected;
   determine that the detected amount of time one of exceeds and falls below a predetermined threshold amount of time to determine, for speech input, that the speech input is intended to be provided in one of the press-to-talk mode and the press-and-release mode;
   determine that received sounds include speech;
   upon determining that the detected amount of time exceeds the predetermined threshold amount of time and that the received sounds include speech, record the speech received in a microphone in the press-to-talk mode in which the input indicator mechanism is selected only while the received sounds include speech; and upon determining that the detected amount of time falls below the predetermined threshold amount of time, record speech received in the microphone in a press-and-release mode.

2. The input device of claim 1, wherein the input device is further programmed to process received sounds according to a low pass filter, a filter of frequencies associated with a human voice, a decimation, and a format conversion.

3. The input device of claim 1, wherein the input indicator mechanism includes at least one of a physical button and a physical switch.

4. The input device of claim 1, wherein the input indicator mechanism includes at least one of a virtual button and a physical switch.

5. The input device of claim 1, further comprising a computing device that includes a processor and a memory, wherein the input device is communicatively coupled to the computing device and is further programmed to provide the recorded speech to the computing device.

6. The input device of claim 5, wherein the memory of the computing device stores instructions such that the computing device is programmed to provide the recorded speech to a remote server for speech recognition.

7. The input device of claim 5, wherein the memory of the computing device stores instructions such that the computing device is programmed to perform speech recognition for the recorded speech.

8. The input device of claim 5, wherein the memory of the computing device stores instructions such that the computing device is programmed to execute a command determined from the recorded speech.

9. The input device of claim 5, wherein the computing device is a set-top-box.

10. A method for distinguishing between providing speech input in a press-to-talk speech input mode versus a press-and-release speech input mode, comprising:
   detecting, in an input device, an amount of time for which an input indicator mechanism is selected;
   determining that the detected amount of time one of exceeds and falls below a predetermined threshold amount of time to determine, for speech input, that the speech input is intended to be provided in one of the press-to-talk mode and the press-and-release mode;
   determining that received sounds include speech;
   upon determining that the detected amount of time exceeds the predetermined threshold amount of time and that the received sounds include speech, record the speech received in a microphone in the press-to-talk mode in which the input indicator mechanism is selected only while the received sounds include speech; and
   upon determining that the detected amount of time falls below the predetermined threshold amount of time, recording speech received in the microphone in a press-and-release mode.

11. The method of claim 10, further comprising processing received sounds according to a low pass filter, a filter of frequencies associated with a human voice, a decimation, and a format conversion.

12. The method of claim 10, wherein the input indicator mechanism includes at least one of a physical button and a physical switch.

13. The method of claim 10, wherein the input indicator mechanism includes at least one of a virtual button and a physical switch.

14. The method of claim 10, further comprising providing the recorded speech from the input device to a computing device via a communicative coupling.

15. The method of claim 14, further comprising providing the recorded speech from the computing device to a remote server for speech recognition.

16. The method of claim 14, further comprising performing speech recognition for the recorded speech in the computing device.

17. The method of claim 14, further comprising executing a command determined from the recorded speech in the computing device.

18. The method of claim 14, wherein the computing device is a set-top-box.

* * * * *